United States Patent [19]

Bidegain

[11] 4,292,102

[45] Sep. 29, 1981

[54] PROCESS AND MACHINE FOR COVERING A TUBULAR MEMBER, MORE PARTICULARLY FOR COVERING A BOX

[75] Inventor: Georgy Bidegain, Serres Castet, France

[73] Assignee: Embadac S.A., Morlaas, France

[21] Appl. No.: 93,600

[22] Filed: Nov. 13, 1979

[30] Foreign Application Priority Data

Nov. 10, 1978 [FR] France ............................ 78 31856
May 23, 1979 [FR] France ............................ 79 13077

[51] Int. Cl.³ ............................ B29C 17/04

[52] U.S. Cl. ............................ 156/213; 53/214; 53/234; 156/443; 156/446; 156/476; 156/479; 156/480; 156/487; 493/388; 493/389; 493/297

[58] Field of Search ............... 156/187, 188, 218, 217, 156/443, 446, 457–458, 483–485, 486–489, 212, 213, 215; 93/36.5 R, 36.8, 44.1 R, 51.1, 54.1, 54 R; 53/214, 234, 378, 170, 563

[56] References Cited

U.S. PATENT DOCUMENTS 940,541 11/1909 MacDonald ........................ 93/54.1
1,875,986 9/1932 Bronander ...................... 93/51.1 X
1,885,910 11/1932 Gwinn et al. ................... 53/234 X
2,737,862 3/1956 Thull ............................ 93/54.1 X

*Primary Examiner*—David A. Simmons
*Attorney, Agent, or Firm*—Young & Thompson

[57] ABSTRACT

In a process and machine for covering a tubular member, with a covering. The tubular member is applied to a median part of the strip portion, leaving at least one protruding edge, the tubular member thus partially applied and adhering to the strip portion is engaged on a mandrel, the strip portion is wound round the tubular member engaged on the mandrel, and to effect this winding, the lateral parts of the strip portion are pulled up on each side of the tubular member, making them adhere to the portions projecting beyond the tubular member, and folding actions are carried out on the projecting parts of the raised lateral parts in order to bring them up to and attach them to the tubular member engaged on the mandrel, with a slight overlap, and the projecting portion of the strip portion is folded over opposite an open end of the tubular member engaged on the mandrel, and this projecting portion is inserted in the open end of the tubular member engaged on the mandrel, by exerting an axial action on the said projecting portion by means of a member, known as the cap, having the same section as the mandrel and mounted so as to be angularly fixed but movable by translation relative to the mandrel.

30 Claims, 23 Drawing Figures

F/G. 1

PROCESS AND MACHINE FOR COVERING A TUBULAR MEMBER, MORE PARTICULARLY FOR COVERING A BOX

BACKGROUND OF THE INVENTION

1. Field of the Invention

This invention relates to a process and a machine for covering a tubular member, such as a box and more particularly for covering, with a sheet of paper or other material, boxes of the kind known as "cloches", made of cardboard, used for packaging in the perfumery field and for other applications, the said tubular member being of any desired shape, such as round, oval, square, polygonal with sharp or rounded edges, etc., and being of any desired height, either tall or short.

2. Description of the Prior Art

Up till now, when covering boxes by machine, it has not been possible to produce boxes the height of which is relatively great in relation to the dimensions of the base, as is the case with "cloche" boxes.

In practice, this covering by machine can only be used for parallelepipedal boxes of relatively low height in relation to the dimensions of the base and with sharp edges. In these machines, a cross-shaped covering is first of all cut out in advance and is placed below the base of the box which is to be covered and the opposite sides of the covering are bent round the bottom edges of the box. A machine of this kind cannot be used to cover "cloche" boxes which are therefore generally covered by hand.

SUMMARY OF THE INVENTION

This invention relates to a process for covering a tubular member of any desired cross section and of any height, large or small, by means of which the covering can be done automatically by a machine.

According to the invention, in a process for covering a tubular member, starting with an adhesive covering strip portion the length of which is slightly greater than the perimeter of the tubular member and the width of which is slightly greater than the height of the tubular member, the tubular member is applied to a median part of the strip portion, leaving at least one protruding edge, the tubular member thus partially applied and adhering to the strip portion is engaged on a mandrel, the strip portion is wound round the tubular member engaged on the mandrel, and to effect this winding, the lateral parts of the strip portion are pulled up on each side of the tubular member, making them adhere to the portions projecting beyond the tubular member, and folding actions are carried out on the projecting parts of the raised lateral parts in order to bring them up to and attach them to the tubular member engaged on the mandrel, with a slight overlap, and the projecting portion of the strip portion is folded over opposite an open end of the tubular member engaged on the mandrel, and this projecting portion is inserted in the open end of the tubular member engaged on the mandrel, by exerting an axial action on the said projecting portion by means of a member, known as the cap, having the same section as the mandrel and mounted so as to be angularly fixed but movable by translation relative to the mandrel.

Thanks to this arrangement, starting from a covering strip portion and not from a cross-shaped blank, the strip portion is satisfactorily wound round the tubular member, by a method which can be automated using a machine, with a slight overlap and with no risk of any bulges, irrespective of the section of the tubular member and the height thereof, whilst the insertion of the projecting portion is carried out without having to remove the tubular member from the mandrel; this means that the winding and insertion operations can be carried out on the same machine, whilst it should be noted that the insertion cap, mounted so as to be angularly fixed and movable by translation relative to the mandrel, is only capable of moving axially towards and away from the mandrel, without any interpenetration of this cap and the mandrel.

The invention also relates to a machine for covering a tubular member, the construction of which is particularly simple and robust, and which can be used to cover a plurality of tubular members at a fast rate, carrying out the winding and insertion operations and also, if necessary, other operations appropriate for the requirements of the covering, such as, for example, folding a second projecting portion over a closed end of the tubular member opposite the open end, in a satisfactory manner, i.e. without any bulges or folds.

According to the invention, a machine for covering a tubular member is characterised in that it comprises a fixed frame, a plate mounted so as to be rotatable on said frame about a general axis, the frame having a plurality of fixed stations for winding an adhesive covering strip portion round the tubular member and for inserting a projecting portion of the strip portion into an open end of the tubular member, the rotating plate having a plurality of spindles parallel to said general axis, each spindle comprising, mounted integrally therewith, a mandrel with the same section as the tubular member and, mounted so as to be angularly fixed and free in translation, a cap with the same section as the mandrel, control means for the rotation of the plate in order to bring the spindles successively to the stations, means for winding the said strip portion round the tubular member engaged on the mandrel and means for moving the cap in translation relative to the mandrel between a distant position and a close position in order to insert the projecting portion of the strip portion into the open end of the tubular member.

In this machine, there are thus a plurality of stations each having a precise function and normally the same number of spindles each having a mandrel and a cap, for example eight stations and eight spindles with a circular symmetry. As a result, the machine processes seven tubular members simultaneously.

The machine rotates by steps to bring each spindle successively to the different stations.

At the first station, the tubular member which has previously been partially applied and adhesively attached to the strip portion is engaged on the mandrel located at this station, by arranging the tubular member so that the strip portion is located on the upstream side in the direction of rotation of the plate of the machine. When the plate rotates to bring the mandrel from the first to the second station, two fixed application means, preferably brushes with a plastic coating, raise the lateral parts of the strip portion on each side of the tubular element and make them adhere to the projections above the tubular element. When the mandrel reaches the second station, a movable application means, consisting of a brush with a plastic coating, for example, sweeps the projecting portion of one of the raised lateral parts to bring it up to and make it adhere to the tubular member. When the mandrel reaches the third station, another movable application means similar to the previous one and preferably formed by a brush with a plastic coating sweeps the projecting portion of the other raised lateral portion to fold it back and make it adhere, with a slight overlap, to the first projecting portion which was folded back and attached at the second station.

In a subsequent station, the cap is moved, by translation, closer to the mandrel, to insert the projecting portion which was previously folded back to give the cap a means of engagement, into the open end of the tubular member. The machine advantageously comprises other stations for improving the conditions of application and also, if necessary, for applying a second projecting portion below a closed end of the tubular member opposite the open end.

DETAILED DESCRIPTION OF THE INVENTION

The embodiment shown in FIGS. 1 to 23 relates, by way of a non-restrictive example, to an application of the invention to a machine for covering a tubular member made of cardboard or some other material in the form of a "cloche" box B (FIG. 2) having an open end EO and a closed end EF, of square cross section with rounded corners and the height of which is relatively great in relation to the sides of the cross section. This covering is effected by means of a sheet of paper P or other material intended to surround the lateral wall of the tubular member B with a projecting portion DO being tucked into the open end EO and with a projecting portion DF being folded over the closed end EF.

With this machine, it is possible to cover a tubular member such as B with any desired cross section, round, oval, square, polygonal or other shape, with sharp or rounded corners and of any desired height, either great or small.

Figure 2:
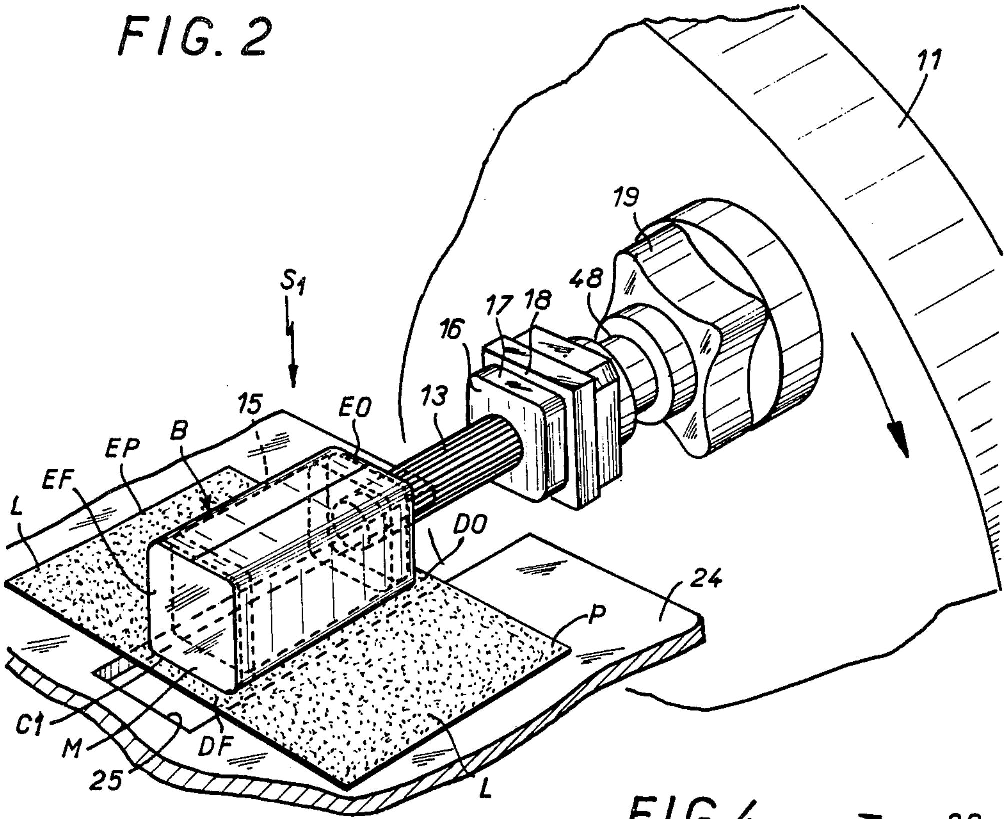
FIG. 2 is a perspective view of a first station where the tubular member, partially applied and adhesively attached to a median part of the strip portion, has been engaged on the mandrel.
Figure 3:
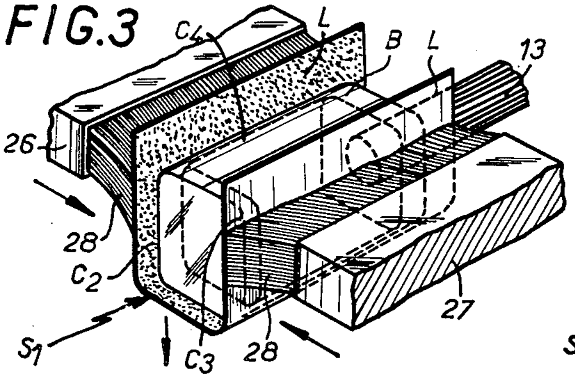
FIG. 3 shows the raising of the lateral parts of the strip portions by means of fixed application means when the mandrel leaves the first station to pass on to the second station.
Figure 4:
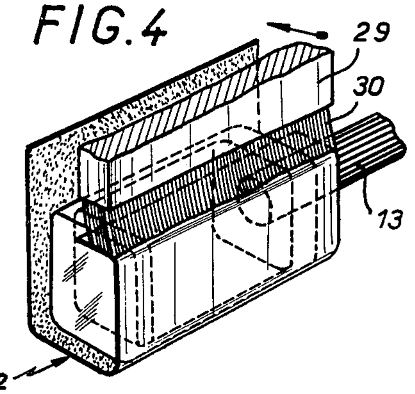
FIG. 4 shows, at this second station, the folding back of the projecting portion of one of the raised lateral parts in order to apply it and make it adhere to the tubular member under the effect of a movable application means.
Figure 5:
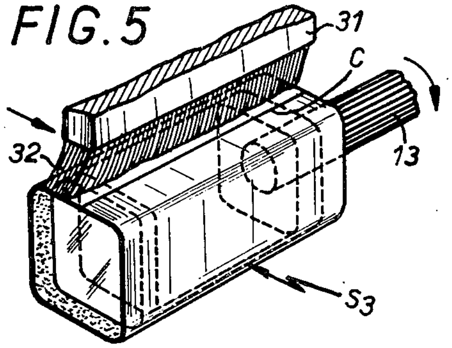
FIG. 5 shows, at the third station, the application of the projecting part of the second raised lateral part to the tubular member with a slight overlap over the first projecting portion which has already been applied at the second station.
Figure 6:
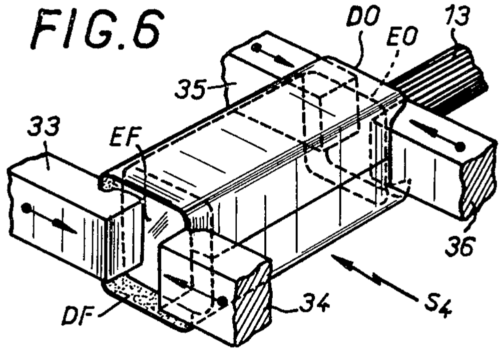
FIG. 6 shows the fourth station where folding means fold the projecting portions along two opposite sides.
Figure 7:
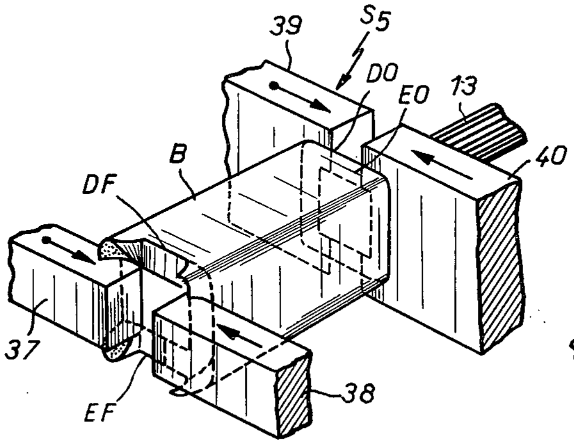
FIG. 7 shows the fifth station where folding means fold the projecting portions along the other two opposite sides.
Figure 8:
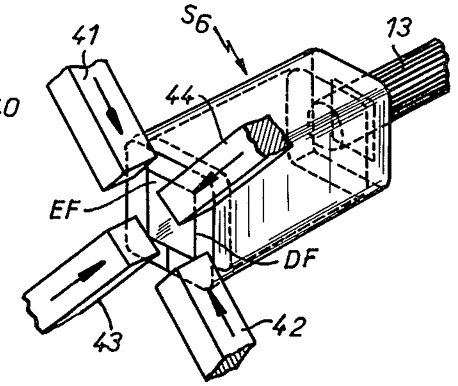
FIG. 8 shows the sixth station where folding means apply the angles of a projecting portion to a closed end of the tubular member.

The sheet of covering paper P which will be used to cover each box B consists of an adhesive strip portion the ends EP of which may be straight, as shown in FIG. 2, but may also be inclined or be of any other shape, provided that these edges EF and EP, after the strip P has been wound round the member B, are adapted to lie close to each other, with a slight overlap.

Figure 1:
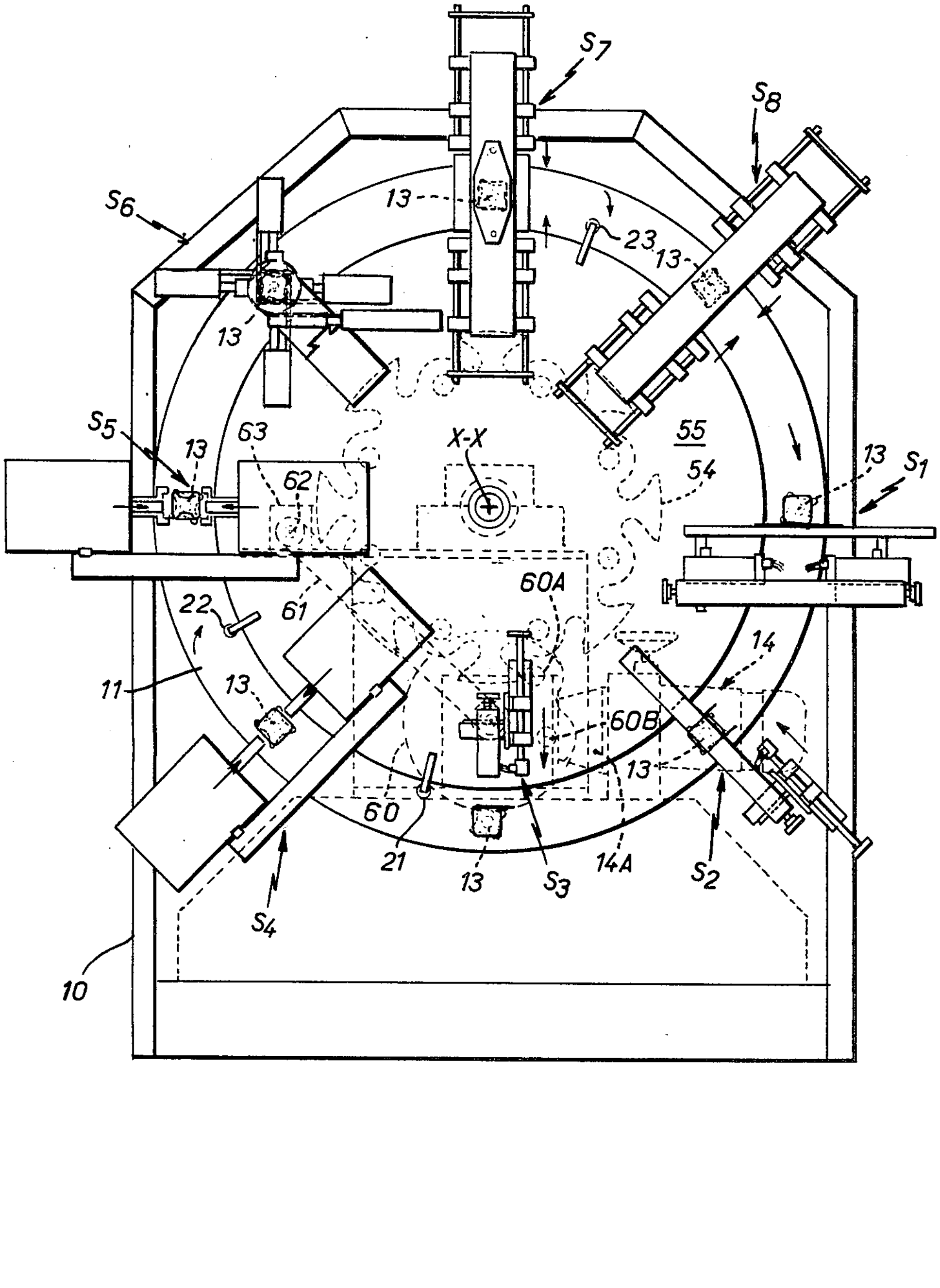
FIG. 1 is a schematic general elevation of a machine according to the invention for covering a tubular member, notably a "cloche"
Figure 21:
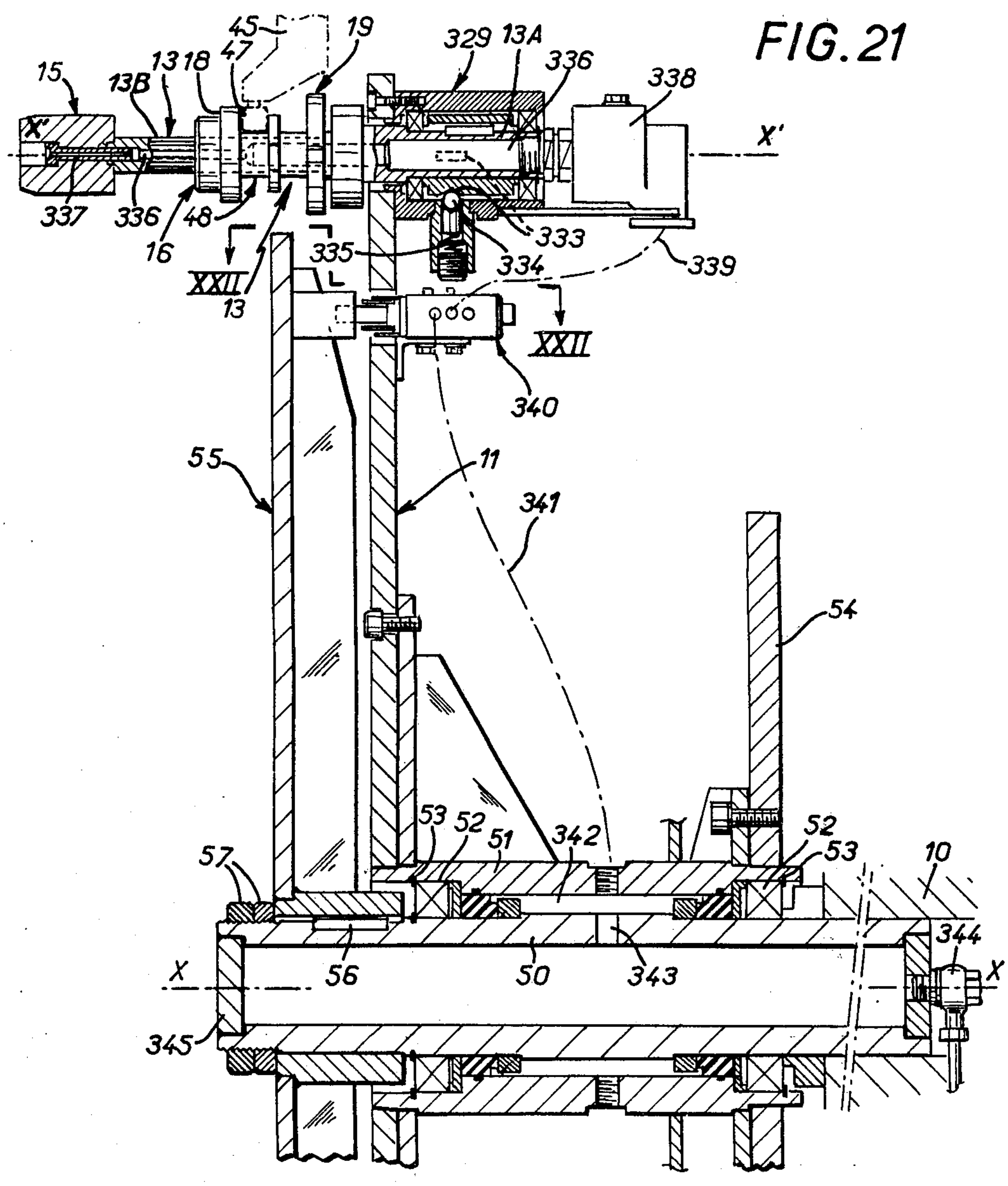
FIG. 21 is a partial vertical view of the machine, the section passing through the axis of a mandrel-carrying spindle.
Figure 22:
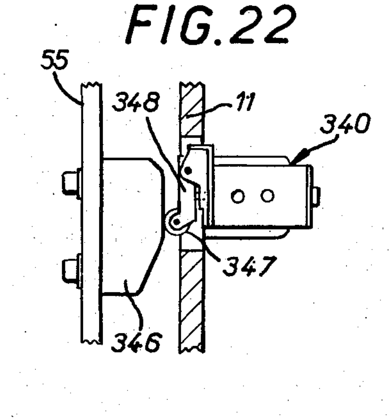
FIG. 22 is a sectional view along a line passing through XXII—XXII in FIG. 21

In FIGS. 1 and 21, in particular, the machine comprises a fixed frame 10 and a plate 11 mounted so as to be rotatable on the frame 10 about a spindle of general axis X—X.

In the example shown, the spindle shown at 50 is horizontal, tubular and fixed, by a terminal portion, to the frame 10 of the machine, with an overhanging section; the overhanging section forms a bearing surface with a sleeve 51 coaxial with the spindle and capable of rotating on the latter by means of conventional bearings 52. The sleeve 51 is axially keyed on the shaft 50 by means of snap rings 53, and at one of its ends it carries the abovementioned rotating plate 11, which may be circular, and at its other end it has a drive means consisting of a St. Andrew's cross 54.

Beyond the rotating plate 11 and opposite the latter there is provided a circular platen 55 which is smaller in diameter than the rotating plate 11; this platen is made integral with the spindle 50 by means of a pin 56 and nuts 57 and is therefore fixed.

The platen carries for example eight fixed working stations indicated throughout by S1, S2 . . . . S8, whilst the rotating plate 11 carries an equal number of spindles, each generally designated by reference numeral 13, all these spindles being similar and adapted to bring a box to each of the working stations for a specific operation.

The rotating plate 11 (FIG. 1) is driven in stepwise rotation by means of a disc 60 comprising two rollers 60A, 60B, meshing alternately with the abovementioned St. Andrew's cross 54, this disc itself being driven in rotation by an electric motor 14 via a reducer 14A which is known per se.

From the reducer 14A, a transmission 61 is adapted to drive in rotation a camshaft 62 adapted to control a complete distribution circuit, which may be hydraulic, for example, (not shown) connected to the movable parts (pushers, folding means, etc.) fitted to the fixed working stations which will now be described more fully.

The working station S1 (FIGS. 1, 2, 3 and 11, 12 in particular) comprises a bedplate 65, of generally horseshoe shape, fixed by one end of one of its branches to the platen 55, whilst the end of the other branch projects relative to the periphery of the platen. Between the two abovementioned branches, the bedplate comprises an opening 65A.

On its upper surface, the bedplate 65 comprises two application means 26, 27 arranged opposite each other and adjustable in spacing parallel to the general plane of the platen by means of ports 26A, 27A; these application means can be blocked in a selected position, e.g. by means of screws 26B, 27B, provided on the bedplate and passing through the abovementioned ports.

The opposite ends of the application means 26, 27 are provided with brushes 28 which advantageously have a coated of plastics film; the bedplate 65 (FIG. 2) also carries a support plate 24, via columns 66 fixed to the bedplate.

The support plate 24 may be at a greater or smaller spacing from the bedplate (arrow F) and may be locked in the selected position by means of a screw 67 cooperating with a column.

The plate 24 also comprises an opening 25 which is provided so as to be substantially above the opening 65A formed in the bedplate 65.

According to an alternative embodiment of the station S1, the application means consist, not of brushes, but of rollers rotatably mounted at the ends of arms which are capable of taking up a selected angular position and which may, furthermore, be spaced from one another, e.g. by being slidably mounted on the bedplate 65.

The fixed station S2 (FIGS. 1, 4 and 13) comprises a bedplate 70 in the shape of an "L", one branch of which is fixed to the platen 55 by any suitable means, e.g. by screwing or soldering, whilst the other branch bears a support 71 to which is fixed a jack 71A the piston rod 71B of which is coupled to a movable application means 29 comprising a brush 30; the support 71 is also adapted to carry bearing blocks 72 in which two rods 73 arranged on either side of the jack can slide, these rods being fixed to the application means 29 at one end and connected to each other by a crosspiece 73A at the other end. The application means is thus guided during its movements from a retracted position to an advanced position and vice versa.

The support 71, together with the fittings which it carries, is associated with the bedplate 70 by means of a slide 74 by means of which it can be adjusted in its position in a direction perpendicular to the axis of the jack 71A, so that the brush 30 can be brought to a suitable height depending on the cross section of the box and be locked in position by means of a screw 74A.

It should also be pointed out that the abovementioned brush 30 could be replaced by a roller rotatably mounted on the application means 29.

The fixed working station S3 (FIGS. 1, 5 and 14) comprises a jack 75 carried by a structure 78 which is slidably mounted parallel to the plane of the platen and can be locked as required in a support 76 by means of two pins 77 and locking screws 77A, the support 76 being integral with the fixed plate 55.

The piston rod of the jack 75 carries on application means 31 provided with a brush 32 having a covering of plastics film.

Here, again, the brush may advantageously be replaced by a roller rotatably mounted on a spindle carried by yokes associated with the application means 31.

As described above with reference to FIG. 13, the application means 31 is associated with guide rods 79 sliding in bearing blocks 80 provided in the abovementioned structure, these guides being braced by a plate 81.

Between the fixed working station S3 and fixed working station S4, the platen 55 carries (see FIG. 1, in particular) a roller 21 whose function is to co-operate with a cam provided on the spindle, which will be described hereinafter, in order to make the box rotate through a quarter-turn along its axis.

The fixed station S4 (FIGS. 1, 6 and 15) comprises a stirrup-shaped bedplate 85 one branch of which is integral with the platen 55, whilst the other branch projects over the periphery of the latter; an opening 86 is thus formed between the two branches of the bedplate which carries a structure having two pairs of folding means 33 to 36 which are movable in a direction parallel to the plane of the platen.

This structure comprises: a pair of beams, of U-shaped cross section, for example 87, 88 which are parallel to each other and to the platen 55, the beam 87 being provided with an opening to allow the spindles 13 to pass through; inside the beam 88 are fixed two opposing jacks 89, 90 the piston rods 89A, 90A of which are attached to carriages 91, 92 sliding on a guide bar 93 which is integral with the beam 88 at its ends.

Associated with the above-mentioned carriages are toothed racks 94, 95 meshing with the same pinion 96 which is rotatably mounted on the beam 88; this assembly makes it possible to synchronise the jacks; each carriage also comprises a triangular framework having a transverse arm 97, 98 the free end of which is guided in a port 99 provided in the beam 87. The two pairs of members 33, 36 are slidably mounted and lockable at will in a selected position on the transverse arms 97, 98 by means of sleeves 33A, 34A, 35A, 36A, respectively, so as to enable them to be positioned on the arms according to the configuration of the box which is to be covered.

It will be noted that the folding means proper 33 to 36 are movably mounted on the sleeves to enable them to be changed rapidly depending on the cross section of a series of boxes which are to be covered.

Between the fixed working station S4 and the fixed working station S5, the platen 55 carries a roller 22 adapted to co-operate with a cam mounted on each of the spindles in order to turn the box through a quarter turn along its axis.

The fixed working station S5 (FIGS. 1, 7 and 16) has a similar configuration to the fixed working station S4.

It should also be noted here that the folding means 37 to 40 which are displaceable parallel to the plane of the plate 11 and platen 55 can easily be removed and replaced by others, depending on the nature of the work to be carried out.

The working station S6 (FIGS. 1, 8, 17 and 18) is arranged on a bracket 141 fixed to the platen 55; slidably mounted on the platen by means of a dovetail 142 are two uprights 143, 143A, at a spacing from each other, forming supports for a sleeve 44 which is fixed in rotation on these uprights, whilst this sleeve receives a roller bearing 144A inside it towards each of its ends.

The sleeve in question carries a first core 145 on which is fixed a pair of diametrically opposite arms 146, 146A, and a second core 147 on which is fixed another pair of diametrically opposite arms 148, 148A, these cores being articulated on the sleeve in the manner of the blades of a pair of scissors.

Each of the arms thus formed comprises, as required, a folding means 41 to 44 (FIG. 8), or two folding means arranged opposite each other 41 to 44 and 41A to 44A (FIGS. 17, 18); the association of the above-mentioned folding means with the corresponding arms is similar for all the folding means and therefore only the assembly of two folding means associated with one arm will be described hereinafter.

Figure 18:
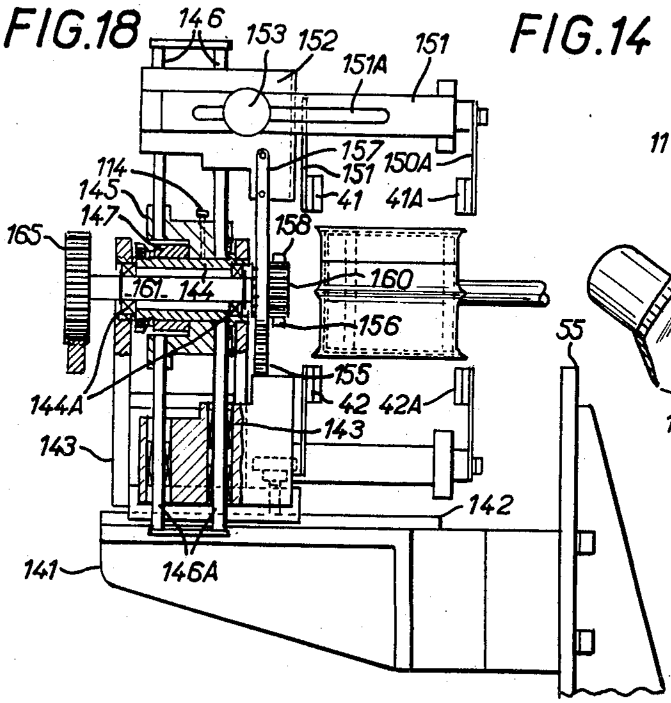
FIG. 18 is a partially sectional view corresponding to FIG. 17 on a line XVIII—XVIII shown on the latter.
Figure 17:
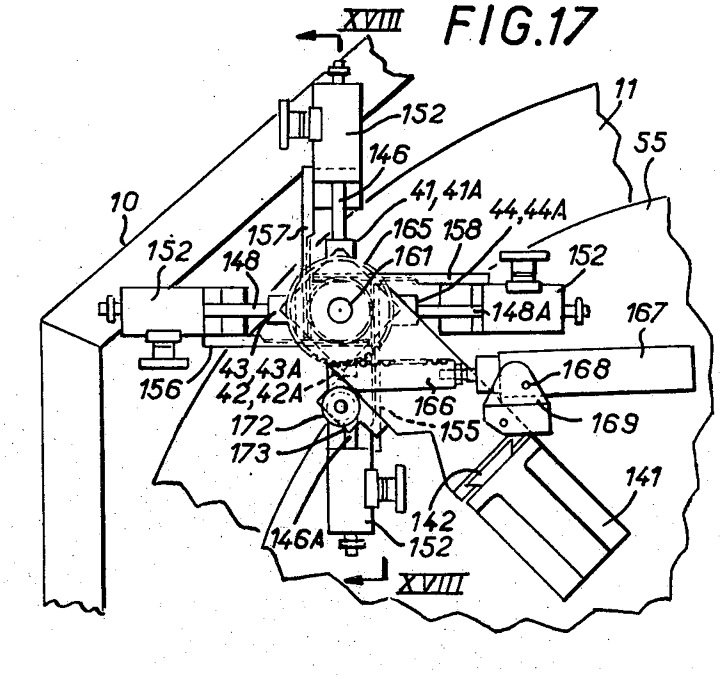
FIG. 17 is a front view of the sixth working station.
Figure 15:
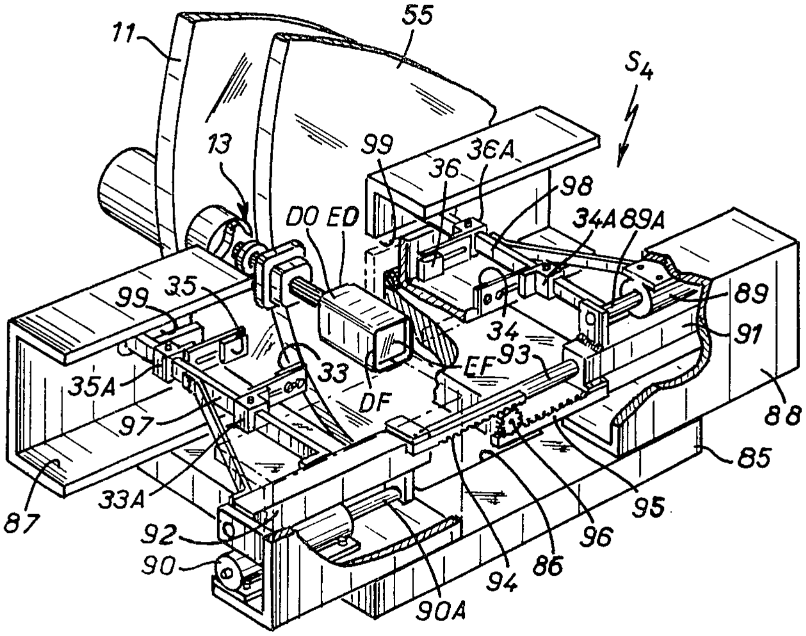
Figure 16:
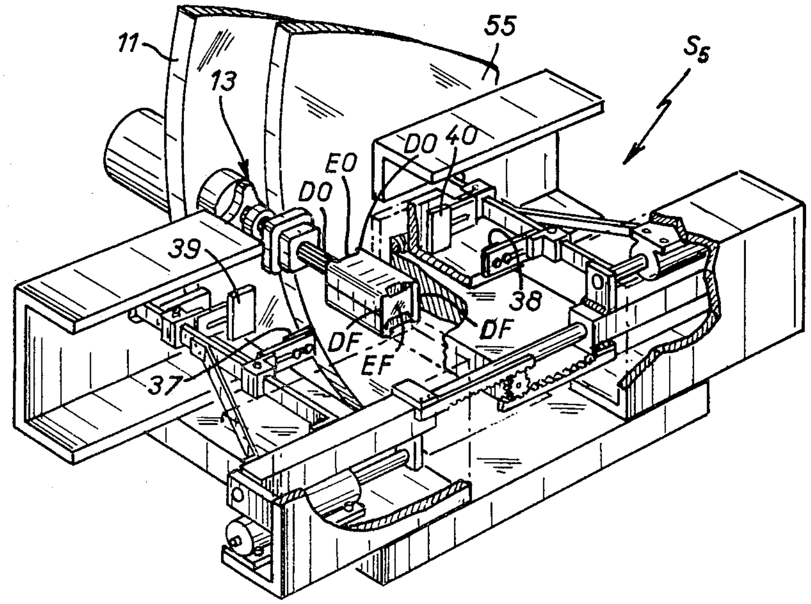

Referring more particularly to FIGS. 17 and 18, the folding means 41, 41A associated with the arm 146 are mounted so as to be adjustable at will on blades 150, 150A which are in turn fixed to a bar 151 oriented perpendicular to the platen; the above-mentioned bar 151 is carried by a block 152 which is slidably mounted on an arm and the bar is also slidable on this arm by means of a longitudinal port 151A and can be locked as required by means of a push button 153.

Thus, a station is obtained, comprising four folding means 41 to 44, adapted to fold the corners formed at one end of the box and four folding means 41A to 44A adapted to fold the corners formed at the other end of the box by acting along the diagonals of the box.

Simultaneous control of all the folding means is obtained by means of toothed racks 155 to 158 fixed to each block 152; the above-mentioned toothed racks 155 to 158 co-operate with a pinion 160, so that when the pinion is made to rotate all the pressing means are displaced simultaneously either towards the box, to effect folding of the corner folds, or, on the other hand, to release the box when the operation is complete.

The above-mentioned pinion 160 is keyed on a spindle 161 which is rotatably mounted in the roller bearings 144A and it is made to rotate (FIG. 17) by means of a toothed wheel 165 keyed on this spindle, this wheel co-operating with a toothed rack 166 constituting the terminal portion of the piston rod of a jack 167 which is oscillatably mounted at 168 on a yoke 169 fixed to the bracket 141.

To ensure that the toothed rack 166 does not escape from the toothed wheel 165 during an operation, a retaining roller 172 is provided which is rotatably mounted on a support 173 fixed to the platen 55.

The above arrangement ensures that the pusher means can be adjusted in their position depending on whether the boxes to be processed are square or rectangular; in fact, the adjustment is made, on the one hand, by angular orientation of the blocks 145, 147 relative to the sleeve 144 and on the other hand by orienting the pusher means 41 to 44, 41A to 44A, relative to the carrier blade with which they are associated. It should also be noted that the blocks 145 and 147 on which the arms 146, 146A and 148, 148A are respectively mounted are lockable, after adjustment, on the fixed sleeve 144 by means of pressure screws 174 (FIG. 18).

The fixed working station S7 (FIG. 19) comprises a support 220, of substantially horseshoe shape, having three branches 220A, 220B, 220C, respectively, this support being fixed to the platen 55 by the branch 220A.

The branches 220A, 220B are adapted so that one accommodates a jack 221 and the other accommodates a jack 222, the piston rods 221A, 222 of which carry an application means 450, 451; the two jacks mentioned above are located in the same plane and opposite each other.

At its free end, the branch 220B is provided with a ferrule 223 to which a jack 225 is fixed via pins 224, the piston rod 226 of this jack being connected to a member 45 carrying a roller 47 the use of which will become apparent hereinafter.

The branch 220C of the support is adapted to receive a jack 230 the piston rod 230A of which is connected to an application means 49. All the application means 49, 450, 451 are associated with rods 231 which are parallel to each other and to the axis of the respective jacks, which are slidably mounted in bearing blocks 232 provided for this purpose on the bedplate.

The jacks 225, 230 have their axes perpendicular to the planes of the platen 55 and the rotating plate 11, whilst the jacks 221, 222 have their axes parallel to the planes of the above-mentioned parts 55 and 11.

Between the fixed stations S7, S8, the platen 55 carries a roller 23 adapted to co-operate with a cam carried by a spindle in order to make the box execute a quarter turn along its axis.

The fixed working station S8 (FIG. 20) has a configuration substantially the same as the fixed station S7; the same reference numerals are used to denote identical parts; however, it should be noted that, at this station, the branch 220C of the support carries a jack 250 the piston rod 251 of which is provided, at its end, with a bellows 252 communicating with a source of suction via an associated connection 253.

In this arrangement, the box B can be extracted from the mandrel 13 by bringing the bellows 227 into contact with the closed end E-F of the box and simultaneously bringing the bellows into communication with the source of suction.

Figure 23:
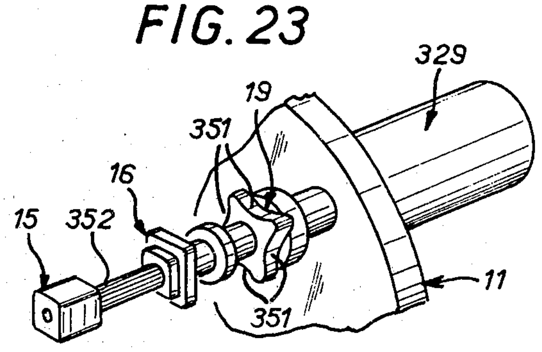
FIG. 23 shows a spindle, in perspective view.

A spindle 13 will now be described in more detail, notably with reference to FIGS. 21 and 23.

The spindle 13 engages in a spindle support 329 fixed to a rear surface of the rotating plate 11; the axis of the spindle support is parallel to the general axis X—X. The above-mentioned spindle support houses the rear portion 13A of the spindle 13, whilst the front portion, overhanging the platen 55, receives a mandrel 15.

The rear portion 13A of the spindle is rotatably mounted in the spindle support 329 about an axis X′—X′ parallel to the general axis X—X; on its outer surface this spindle portion comprises four stamps 333 regularly spaced along a circumference and adapted to co-operate with a stabilising device consisting of a ball 334 subjected to the action of a spring 335.

The spindle 13 also comprises an axial duct 336 extending from one end of the spindle to the other, so that the duct opens into a passage 337 provided in the mandrel 15 and a connecting enclosure 338 which is in turn connected, by a channel 339, to a distributor 340 connecting by tubing 341 to an annular collector 342 provided between the sleeve 51 and the spindle 50; this collector communicates with a source of suction (not shown here) by means of at least one radial passage 343 provided in the spindle 50 and a connection 344; obviously the spindle 50 is sealed off at its other end by means of a stopper 345.

Thus, each of the spindles 13 is connected to a source of suction via a distributor and for this purpose the sleeve 51 comprises a series of radial passages to which the tubes 341 are connected.

The distributor 340 is fixed to the rotating plate 11 and is activated (FIG. 22, in particular) when it is presented before a ramp 346 fixed to the surface of the platen 55 which is facing the rotating plate 11; this ramp co-operates with a roller 347 associated with a pusher 348 pivotably mounted on the distributor.

The above-mentioned ramp 346 and the distributor 340 are adapted to cut off the supply of the suction circuit, by co-operating with each other, so as to enable the mandrel 15 to be withdrawn from the covered box B; this removal occurs at the station S8. Since the platen 55 has only one ramp 346 the distributors are actuated only once during their travel and they maintain suction in the channels and hence at the mandrels, so that the boxes are held against the mandrels throughout their journey.

Figure 14:
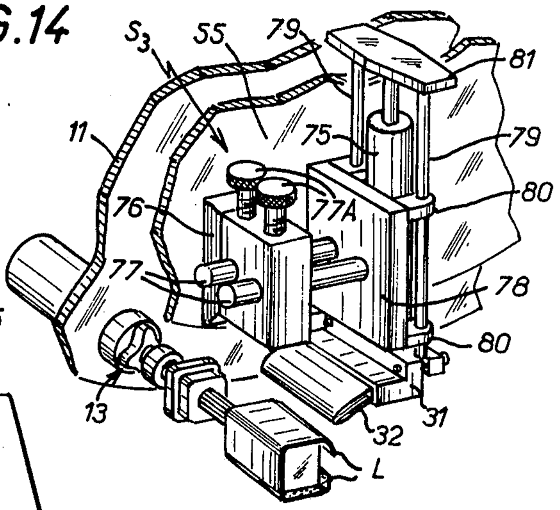

A cam 19 is keyed on the spindle 13 and is intended to co-operate with the above-mentioned fixed rollers 21 to 23 to make the spindle turn through a quarter turn and for this purpose it comprises four uniformly distributed peripheral depressions 351 (FIG. 14).

In front of this cam 19, the spindle 13 comprises a grooved outer surface 352 on which there engages a cap 16 which is rotationally integral with the spindle 13 whilst being capable of sliding axially on the latter.

It should be noted that the machine described above can be adapted, depending on the shapes and dimensions of the boxes which are to be covered, by changing members such as the mandrel, cap, pusher means and folding means of suitable configuration and, also, if necessary, by making simple adjustments.

The method of operation is as follows.

First of all, the adhesive covering strip P (FIG. 2) is prepared, which is slightly longer than the perimeter of the tubular member B, and whose width is slightly greater than the height of the tubular member B, to form projections DO and DF.

The tubular member B is partially applied to a median part M of the strip portion P on the adhesive surface of the latter, leaving the projections DO and DF protruding.

These operations are carried out in the immediate vicinity of the machine at a rate which corresponds to that of the machine. The box B, thus partially applied and attached by a first side C1 to the median part M of the strip portion B is taken and engaged on the mandrel 15 which is located at station S1 (FIGS. 1, 2 and 3) slightly above the platen 24. This engagement is continued until the base EF abuts on the mandrel 15. The adhesive strip portion P is arranged horizontally on the platen 24 with the median part M overhanging the opening 25, whilst the lateral parts rest on both sides of the box B on the platen 24.

This engagement is made during the time that the mandrel 15 stays at the station S1. When the mandrel 15 moves, with the general stepwise movement of the machine, from station S1 to station S2 (FIGS. 1, 4 and 13), the fixed brushes or rollers covered with plastics 28 raise the lateral parts on the second and third sides C2 and C3 of the box B, thus adhesively attaching them and making them project at L (FIG. 3) above the fourth side C4 of the box B.

When the mandrel reaches the station S2 and during the time it stays there, the plastics-coated brush 30 driven by the movable member 29 sweeps one of the projections L to make it lie flat and attach it to half the fourth side C4 of the box B.

When the mandrel 15 reaches station S3 (FIGS. 1, 5 and 14) the same operation is repeated, but with the plastics-coated brush 32 applying the other projection L along the other half of the fourth side C4, with an overlap over the first projection which has already been applied.

During the movement of the mandrel 15 between stations S3 and S4, the mandrel is able to make a quarter-turn under the control of the roller 21 acting on the cam 19. When the mandrel 15 reaches the station S4 (FIGS. 1, 6 and 15) and while it stays there, the folding means 33, 34, 35 and 36 are actuated and fold the projections DO and DF along two opposite sides, along the closed end DF and open end EO, then the mandrel passes from station S4 to station S5. During this passage, it is able to rotate through a quarter turn under the action of the roller 22 acting on the cam 19.

When the mandrel 15 has reached station S5 (FIGS. 1, 7 and 16) and while it is there, the folding means 37, 38, 39 and 40 fold the remaining sides of the projections DF and DO on to the closed end EF and open end EO of the box B.

Figure 9:
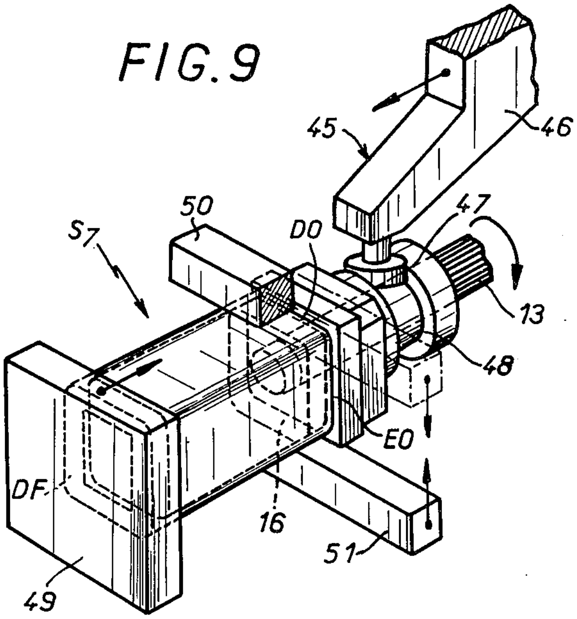
FIG. 9 shows the seventh station where the cap, allowed to move axially up to the mandrel, inserts the projecting portion in the open end of the tubular member, whilst pressure is exerted, on the one hand, on the two ends of the tubular member and, on the other hand, along two opposite sides, near the open end of the tubular element, when the cap is engaging in this open end.
Figure 10:
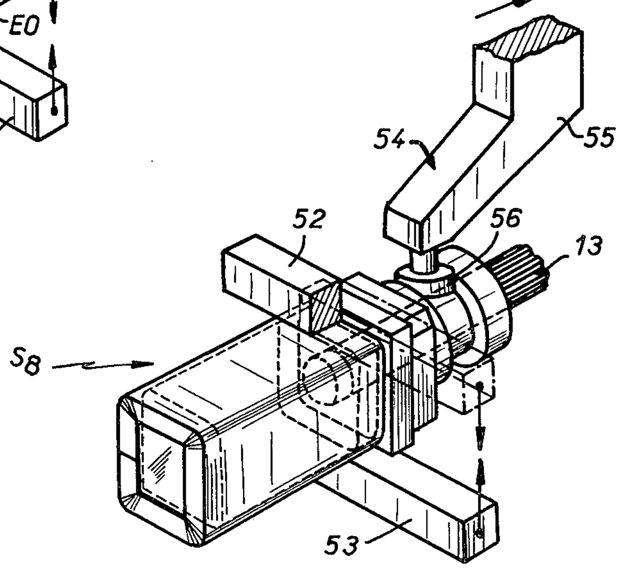
FIG. 10 schematically shows the eighth station where pressure is exerted along the two other opposite sides near the open end of the tubular member whilst the cap is still engaging in this open end.
Figure 11:
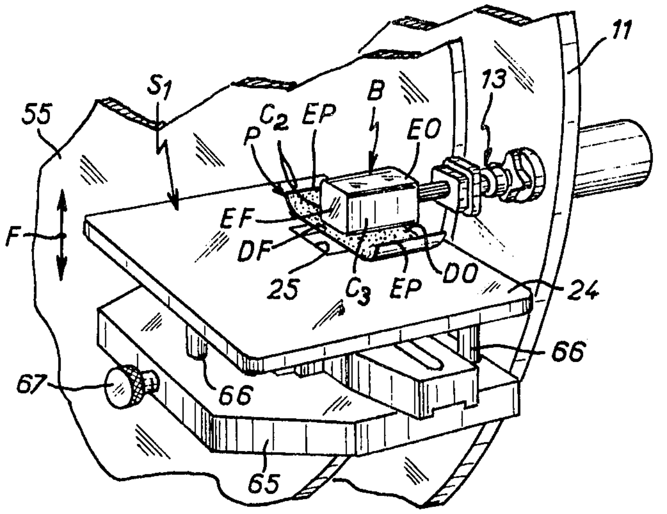
FIGS. 11 and 12 are perspective views of an embodiment of the first fixed station.
Figure 12:
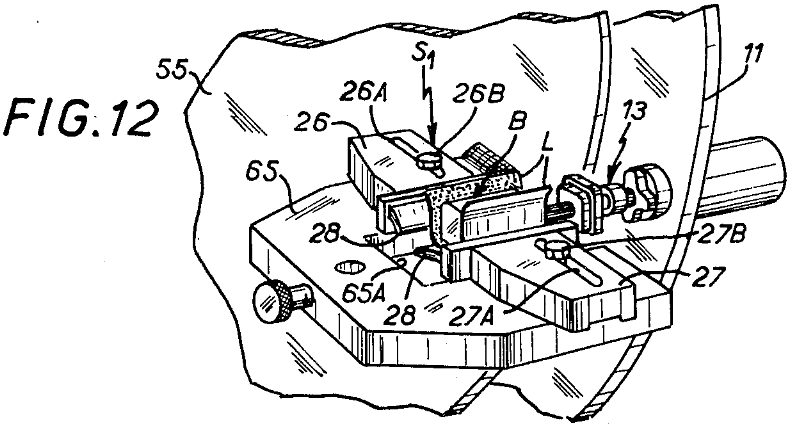
Figure 13:
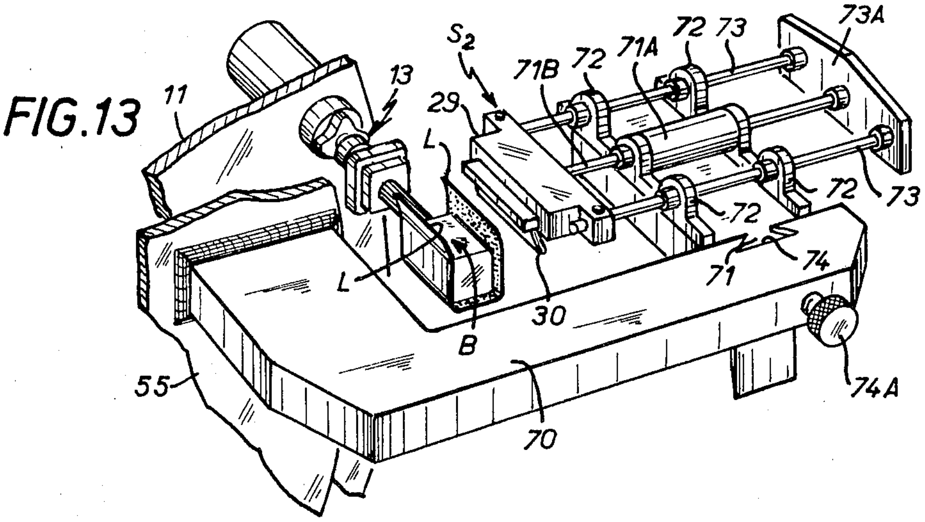
FIGS. 13 to 16 show, again in perspective views, an embodiment of the second, third, fourth and fifth fixed stations.
Figure 19:
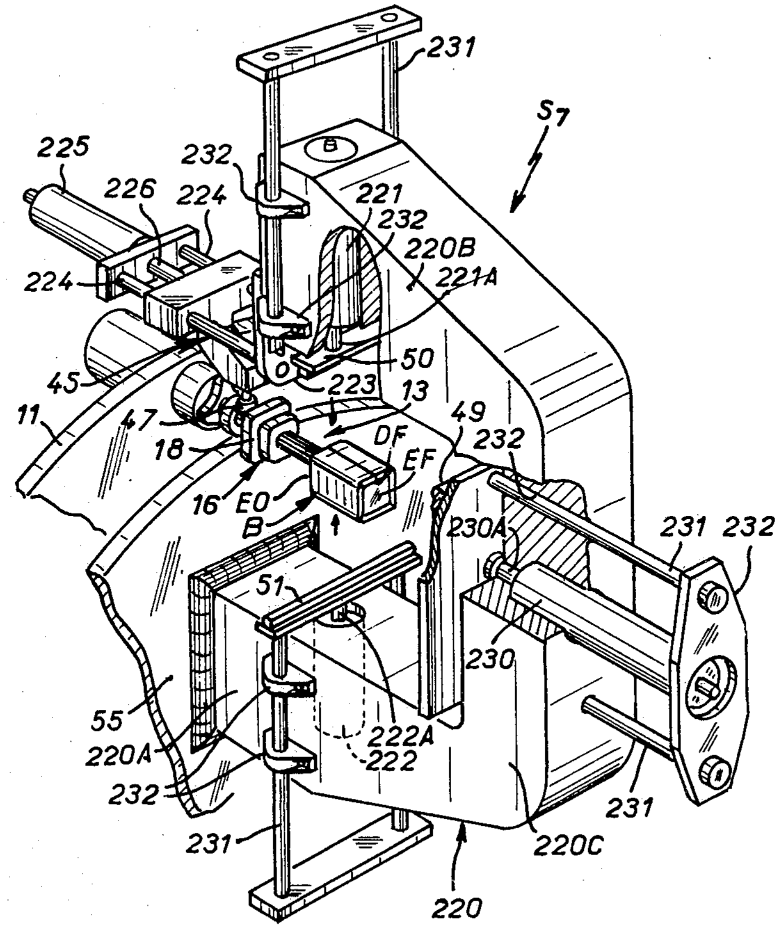
FIGS. 19 and 20, respectively, show perspective views of the seventh and eighth fixed stations.
Figure 20:
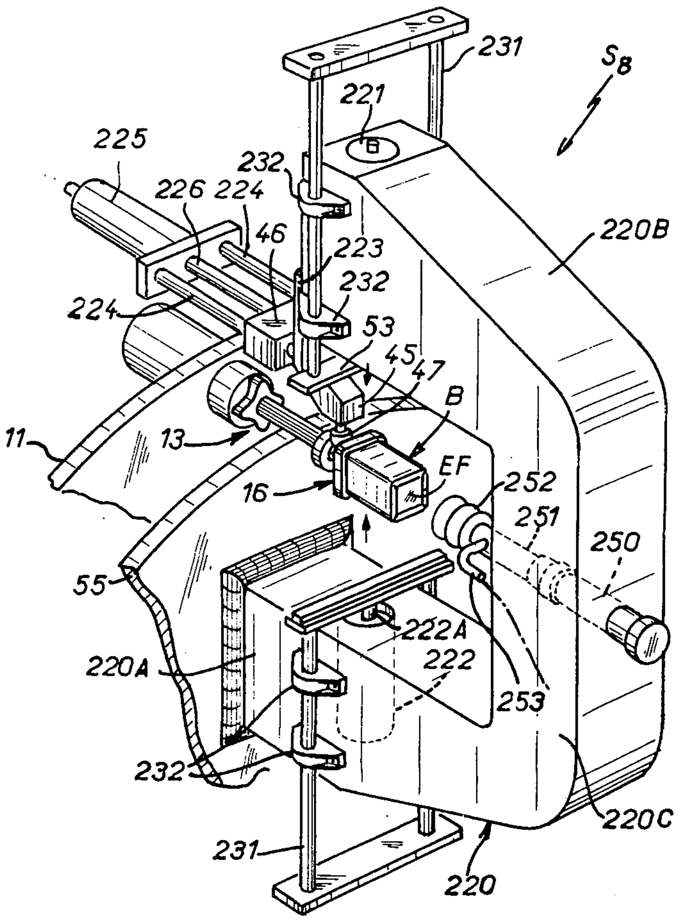

The mandrel 15 then moves on to station S6 (FIGS. 1, 8, 17 and 18). At this station, the folding means 41 to 44 and the folding means 41A or 44A fold the projections DF, along the angles of the box B, on to the closed and open ends EF and EO, respectively, of the box, then the mandrel 15 reaches the station S7 (FIGS. 1, 9 and 19).

At this station S7 (FIGS. 9 and 19), the application means 49 is the first to act, with the effect of pressing the projection DF thoroughly against the closed end of the box EF and applying the portion of packaging against the portion of the box; the control 45 is then immediately actuated and causes the cap 16 to slide, via the roller 47, along the spindle and brings this cap into engagement in the open end EO of the box, with the result that the already folded projection DO is inserted in the box at the station 37. Immediately afterwards, the members 450, 451 come into play, with the result that the projection DO is thoroughly applied, on two opposite sides, on to the inner wall of the box and pressure is exerted on the part of the covering located near the opening EO, by abutment on the outer wall of the box.

Then, when the cap 16 is still engaging in the open end EO, the mandrel 15 passes from the station S7 to the station S8. During this movement (FIG. 1) the mandrel is able to perform a quarter turn under the effect of the roller 23 acting on the cam 19.

When the mandrel 15 reaches the station S8 and stays there (FIGS. 1, 10 and 20) the members 452 and 453 come into effect and apply the projection DO against the inner wall of the box and apply the outer marginal portion of the packaging to the outer wall of this box, along the two remaining opposite sides which were not treated at station S7. Then, after these pressing members 452 and 453 have been released, the control 454 by acting on the roller 456 in the groove 48 causes the cap 16 to retract by moving it away from the mandrel 15.

It should be noted that, to prevent any possible displacement of the box B on the mandrel 15, the box is held in contact with the mandrel throughout the time that it takes for it to set from the fixed working station S1 to the station S8. For this purpose, each mandrel 15 is connected to a source of suction by the means described above.

At station S8, the suction in the mandrel 15 is cut off by the action of the roller 347 on the distributor 340 under the effect of the cam 346; the jack 250 is then put under pressure and the suction is introduced into the bellows 252, so that the box B is withdrawn from the mandrel 15 then gripped manually after the suction in the bellows has been cut off.

It should be noted that all the jacks are controlled from the central control unit 63 so that the machine can be used to process seven boxes continuously at the same time as long as the station S1 is supplied with them.

It should also be noted that a box generally consists of two parts, namely a first part known as the "cloche", fitting at least partially over a second part known as the base.

When a part of a box is covered with a sheet, a line appears on one side, owing to the fact that the original sheet is dimensioned so that a marginal strip on one side is superimposed over the other side, thus forming the line in question.

To produce boxes with a perfect finish, the line of the base and the line of the "cloche" should lie on an extension of each other.

With a machine such as the one described above, it would be possible to produce both "cloches" and bases, but in this case there would be a risk that the lines would not be perfectly aligned.

Therefore, to remedy this shortcoming, the invention proposes the use of two machines, one of which is like the one described above, adapted to carry out the covering of "cloche"-type containers, whilst the other is intended for covering the bases.

For this purpose, this second machine is analogous to that described above, but the working stations and the direction of rotation of the rotating plate 55 are reversed.

More precisely, in this other machine, the station S1 is in place of the station S5, the station S2 is in place of the station S4, the station S3 is in its own place, the station S4 is in the place of station S2 and so on.

It will be noted that the machine described can be used to treat seven boxes at the same time, thus resulting in a fast work rate.

It will also be appreciated that it results in automatic covering of the boxes, which may be of any cross section and height, whilst producing a perfect finish. Moreover, this machine can be adapted, by simple adjustments and by changing the mandrel 15 and cap 16, to all sorts of shapes and dimensions of boxes which are to be covered.

Obviously, the invention is not limited to the embodiment chosen and shown, but may be subjected to various modifications without going beyond the scope of this invention.

We claim:

1. A machine for covering a tubular member with sheets, comprising a fixed frame, a plate mounted so as to be rotatable on the frame about a general axis, the frame having a plurality of fixed stations for the winding of an adhesive covering strip portion around the tubular member and for inserting a projection of the strip portion into an open end of the tubular member, the rotating plate having a plurality of spindles parallel to the general axis, each spindle having a mandrel of the same cross section as the tubular member mounted integrally therewith, and, mounted so as to be angularly fixed and freely movable in translation, a cap of the same cross section as the mandrel, means for controlling the rotation of the plate in order to bring the spindles successively up to the stations, means for winding the strip portion about the tubular member engaged on the mandrel, means for moving the cap in translation relative to the mandrel between a distant position and a near position in order to insert the projection of the strip portion into the open end of the tubular member, and a spindle integral with the frame and defining said general axis, said spindle having an overhanging portion supporting, at its free end, a fixed platen on which the various working stations are mounted.

2. A machine for covering a tubular member with sheets, comprising a fixed frame, a plate mounted so as to be rotatable on the frame about a general axis, the frame having a plurality of fixed stations for the winding of an adhesive covering strip portion around the tubular member and for inserting a projection of the strip portion into an open end of the tubular member, the rotating plate having a plurality of spindles parallel to the general axis, each spindle having a mandrel of the same cross section as the tubular member mounted integrally therewith, and, mounted so as to be angularly fixed and freely movable in translation, a cap of the same cross section as the mandrel, means for controlling the rotation of the plate in order to bring the spindles successively up to the stations, means for winding the strip portion about the tubular member engaged on the mandrel, means for moving the cap in translation relative to the mandrel between a distant position and a near position in order to insert the projection of the strip portion into the open end of the tubular member, and a spindle integral with the frame and defining said general axis, said spindle having an overhanging portion supporting, at its free end, a fixed platen on which the various working stations are mounted and, between this platen and the frame, the rotatably mounted plate.

3. A machine according to claim 2, wherein a fixed station is adapted to permit engagement on the mandrel of the tubular member which is applied and attached to a median part of the strip portion and comprises fixed means for raising the lateral parts of the strip portion on each side of the tubular member, causing them to adhere to the projections above the tubular member when the plate rotates to bring the mandrel from this station to the next station.

4. A machine according to claim 2, comprising a station having movable application means adapted to fold the projection of one of the raised lateral parts when the mandrel is at this station.

5. A machine according to claim 4, comprising a station adapted to fold the projection of the other lateral part on to the tubular member when the mandrel is at this station.

6. A machine according to claim 2, comprising a station for folding two opposite sides of the projection along the open end of the tubular member, when the mandrel is at this station.

7. A machine according to claim 6, comprising a station for folding back the remaining opposite sides of the projections, when the mandrel is at this station.

8. A machine according to claim 2, comprising a station where the cap is moved in translation relative to the mandrel for engagement of the cap in the open end of the tubular member and for insertion of the projection, this station also comprising means for pressing the portion of the tubular member against a shoulder of the cap.

9. A machine according to claim 8, wherein the said station also comprises means for applying, along two opposite sides, the strip portion on the inner and outer walls of the tubular member in the vicinity of its open end.

10. A machine according to claim 9, comprising a station having means for applying the remaining opposite sides of the strip portion on to the inner and outer walls of the tubular member in the vicinity of its open end.

11. A machine according to claim 10, wherein the said station also comprises means for releasing the cap from the open end of the tubular member after the application means have been released.

12. A machine according to claim 2, wherein the tubular member has a closed end opposite the open end and the strip portion has a projection intended to cooperate with this closed end, and the machine comprises stations where this second projection is folded on to the closed end.

13. A machine according to claim 12, wherein one of these stations cooperates with two opposite sides of this second projection, at the same time as the same opposite sides of the first projection are being processed.

14. A machine according to claim 12, comprising another station where the remaining opposite sides of the second projection are treated at the same time as those of the first projection.

15. A machine according to claim 13, comprising a station wherein the second projection is folded, along the angles of the tubular member, on to the closed end.

16. A machine according to claim 2, wherein the rotating plate and the platen are circular, the fixed working stations are oriented substantially radially relative to the general axis, and the rotating plate comprises a sleeve mounted so as to be rotatable on the overhanging part of the spindle, this sleeve in turn carrying a member adapted to cooperate with drive means.

17. A machine according to claim 2, wherein each spindle and associated mandrel comprises an axial passage which is connected, on the side opposite the mandrel, to a suction device through a distributor, these distributors themselves being connected to a collector communicating with the suction device.

18. A machine according to claim 2, wherein the overhanging spindle is hollow and, in conjunction with the sleeve on which the rotating plate is mounted, it forms the collector adapted to be connected in leaktight manner to a suction source, the sleeve comprising for this purpose a plurality of radial passages each intended to be connected to a distributor.

19. A machine according to claim 2, wherein the spindles are rotatably mounted in a spindle support fixed to the rotating plate, whilst retractable means, e.g. consisting of ball and push member, are provided for immobilising the spindles in rotation in a predetermined position.

20. A machine according to claim 2, wherein a cam is keyed on each spindle and is adapted to cooperate with means, such as rollers, associated with the platen, these rollers being arranged between some of the fixed working stations, to act on a cam and cause the spindle to rotate through a quarter turn.

21. A machine according to claim 2, wherein the platen carries, for example, eight successive working stations, and the rotating plate has a corresponding number of spindles each rotatably mounted in a spindle support associated with the rotating plate, with mandrel, cap, cam and means for immobilising the spindles in a selected position, the fixed stations and spindles having a corresponding rate.

22. A machine according to claim 2, wherein the first working station comprises a bedplate integral with the platen, surmounted by a plate parallel to the bedplate and mounted so as to be adjustable in its spacing therefrom, these two members each having an opening located in the path of the box, the opening in the plate enabling the strip to be folded on to two sides of the box to form two projections, whilst adjustable application means arranged between the bedplate and the platen are provided, for example, with brushes or rollers having a covering of plastics film to exert pressure on the strip portions folded back on two lateral sides of the box.

23. A machine according to claim 2, wherein the second working station comprises a bedplate integral with the platen, with an opening in the path of the box and carrying an oriented jack associated with an application means comprising a brush or roller with a plastic covering, the means being adjustable in position and adapted to fold on to the box the projecting portion of one of the raised lateral parts of the strip.

24. A machine according to claim 2, wherein the third station comprises a bedplate integral with the platen and a jack adjustable in its position on this bedplate in two orthogonal directions, the jack comprising an application means such as a brush or roller with a plastics covering for folding the other projecting portion of the strip on to the box.

25. A machine according to claim 2, wherein the fourth and fifth stations each comprise a bedplate integral with the platen, with an opening enabling the box to pass through, this bedplate supporting a structure comprising two opposing jacks each coupled to a triangular reinforcement, the reinforcement having a guided arm, parallel to the general axis, adapted to carry at least one folding means which is adjustable in its position on the arm, the folding means thus being movable from a retracted position to an advanced position where, on two opposite sides, they effect folding of the projecting end parts of the strip on to the box, this box being pivoted through a quarter turn about its axis between the two stations.

26. A machine according to claim 2, wherein the sixth station comprises a bracket integral with the platen, and adjustable in its position parallel to the general axis, the bracket carrying a pair of arms articulated in the manner of scissor blades, which can be locked at will about a rotation axis, whilst each of the four arms thus formed carries a block which is slidably mounted on the arm and carries at least one folding means which is adjustable in position, these blocks comprising a toothed rack coupled to a drive pinion rotationally driven by meshing with a toothed rack associated with a jack, so that the blocks and hence the folding means are displaced simultaneously towards the axis of the box and vice versa, to fold the creases formed at the angles of each end of the box.

27. A machine according to claim 2, wherein the seventh station comprises a bedplate forming a passage for the boxes, whilst this bedplate, which is integral with the platen, is adapted to carry, on the one hand, opposing jacks each fitted with pressing means and, on the other hand, a jack with an axis perpendicular to the preceding ones, having an associated pressing means, whilst another jack is provided for maneuvering the cap on the spindle in translation parallel to the general axis.

28. A machine according to claim 2, wherein the eighth station, which is of substantially the same configuration as the seventh station, comprises, opposite the mandrel, a jack carrying a bellows connected to a source of suction.

29. A machine according to claim 2, wherein at least one of the stations can be neutralised as a function of the profile of the box to be covered, and that the pressing means and application means are interchangeable.

30. A process for covering a tubular member, starting with an adhesive covering strip portion, slightly longer than the perimeter of the tubular member and the width of which is slightly greater than the height of the tubular member, comprising the steps of:

applying the tubular member to a median part of the strip portion, leaving at least one projecting portion;

engaging on a mandrel the tubular member thus partially applied and adhesively attached to the strip portion;

winding the strip portion round the tubular member engaged on the mandrel, and, to effect this winding, raising the lateral parts of the strip portion on each side of the tubular member, making them adhere to the projections above the tubular member, and exerting folding actions on the projecting portion of the raised lateral parts to bring them into position and make them adhere, with a slight overlap, to the tubular member engaged on the mandrel;

folding back the projection of the strip portion opposite an open end of the tubular member engaged on the mandrel;

inserting this projection in the open end of the tubular member engaged on the mandrel, by exerting axial force on the projection by means of a member, known as the cap, having the same cross section as the mandrel and mounted so as to be angularly fixed but movable in translation relative to the mandrel;

performing the aforementioned steps at a plurality of work stations disposed about a fixed platen supported on the overhanging end of a horizontal spindle whose other end is fixedly secured to a stationary frame, and providing a plurality of said mandrels mounted on a rotation plate that rotates on said spindle.

* * * * *